US005348807A

United States Patent [19]

Hodder et al.

[11] Patent Number: 5,348,807

[45] Date of Patent: Sep. 20, 1994

[54] POLYMERIC RETAN FATLIQUOR FOR LOW FOGGING UPHOLSTERY LEATHER

[75] Inventors: James J. Hodder, Doylestown; Patricia M. Lesko, Lansdale; Thomas Stewart, Doylestown, all of Pa.

[73] Assignee: Rohm and Haas Company, Philadelphia, Pa.

[21] Appl. No.: 650,524

[22] Filed: Feb. 5, 1991

[51] Int. Cl.$^5$ .......................... B32B 9/02; B32B 9/04

[52] U.S. Cl. .................................. 428/473; 8/94.1 R; 8/94.21; 8/94.33; 427/389; 428/521; 428/522

[58] Field of Search .................. 8/94.33, 94.26, 94.27, 8/94.1 R, 94.21, 436; 252/8.57; 427/389; 428/473, 521, 522

[56] References Cited

U.S. PATENT DOCUMENTS

| | | | |
|---|---|---|---|
| 4,062,647 | 12/1977 | Beir et al. | 8/94.33 |
| 4,217,106 | 8/1980 | Prentiss et al. | 8/94.33 |
| 4,314,800 | 2/1982 | Monsheimer et al. | 8/94.1 |
| 4,439,201 | 3/1984 | Lowell et al. | 8/94.33 |
| 4,447,221 | 4/1984 | Loechel et al. | 8/94.33 |
| 4,482,007 | 4/1989 | Papayannis et al. | 8/94.33 |
| 5,124,181 | 6/1992 | Schaffer et al. | 427/323 |

FOREIGN PATENT DOCUMENTS

| | | |
|---|---|---|
| 1235496 | 3/1967 | Fed. Rep. of Germany . |
| 0118706 | 6/1983 | Poland . |

*Primary Examiner*—Michael Lusignan
*Attorney, Agent, or Firm*—Wendy A. Taylor

[57] ABSTRACT

A method for treating leather with a low fogging, substantive, retan fatliquor containing a dispersion of a selected amphiphilic copolymer, substantially free from organic solvents, formed from a predominant amount of at least one hydrophobic monomer and a minor amount of at least one copolymerizable hydrophilic monomer. The method produces leather having desirable strength and softness qualities and particularly reduced fogging characteristics, the leather being particularly suitable for use in vehicle upholstery.

9 Claims, No Drawings

POLYMERIC RETAN FATLIQUOR FOR LOW FOGGING UPHOLSTERY LEATHER

CROSS-REFERENCE TO RELATED APPLICATIONS

This patent application is related to U.S. patent application Ser. No. 279,181 filed on Dec. 2, 1988 entitled Leather Treatment with Selected Amphiphilic Copolymers.

FIELD OF THE INVENTION

This invention is directed to a method for treating leather with a polymeric retan fatliquor to obtain acceptable strength and aesthetic properties and most particularly significantly low fogging characteristics. More particularly, the invention is directed to the use of a selected amphiphilic copolymer as a substantially solventless retan fatliquor for significantly reducing fogging in vehicle upholstery leather.

BACKGROUND OF THE INVENTION

The physical and aesthetic requirements for a particular piece of leather are highly dependent on the designated end use for the leather. For example, in one application, a piece of leather may be treated primarily to provide it with strength; its other aesthetic qualities being of much less importance for its intended application. In upholstery applications, both softness and strength are required. In vehicle upholstery, as for example in automobiles and aircraft, the treated leather should also not contribute to fogging.

Treating hides and skins to form leather involves a number of interdependent chemical and mechanical operations. Each of these operations has an effect on the final properties of the treated leather product. See *Leather Facts,* New England Tanners (1972). One important chemical operation in the treatment of leather is fat-liquoring. Fatliquoring is used to impart the desired strength and temper properties to tanned leather. Fatliquors lubricate the leather fibers so that after the leather is dried its fibers are capable of sliding over one another. In addition to regulating the pliability of the leather, fatliquoring contributes greatly to the tensile and tearing strength of the leather. Fatliquoring also affects the tightness of the break or crease pattern formed when the grain surface is bent inward; the object being to produce a leather which leaves no or few fine wrinkles when bent. The subject matter of applicants related copending patent application identified above was to selected amphiphilic copolymers which performed both as retanning and fatliquoring agents and provided the treated leather with a number of desirable properties including, in its preferred embodiment, improved water resistance.

The basic ingredients used in conventional fatliquoring operations are water insoluble oils and fatty substances such as raw oils and sulfated and sulfited oils. Typically the weight percent of fatliquor oil on weight of leather ranges from 3 to 10 percent. The manner in which the oil is distributed throughout the leather affects the character of the leather and subsequent finishing operations. In order to obtain a uniform oil coating over a large surface of leather fibers it is typically necessary to dilute the oil with an organic solvent or preferably to disperse the oil in an aqueous system using emulsifiers. See *Leather Technician's Handbook,* J. H. Sharphouse, Leather Producers' Association (1971) chapters 21 and 24. The basic ingredients used in fatliquoring leather have been found, however, to have a significant adverse impact on the ultimate fogging characteristics of the leather.

"Fogging" as used herein means the condensation of evaporated volatile substances, which come from the interior outfit of a vehicle, on glass windows, particularly on the windshield (See DIN 75201 (April 1988)). Fogging is undesirable because it hinders the unimpeded vision of the driver, especially during darkness, and particularly when the driver is faced with lights of oncoming traffic. A secondary effect is caused by dust and dirt particles brought into the interior through the fan; these becoming bound to the glass surface causing further visibility impairment.

*Das Leder,* 1988, Issue 9, *Fat Liquors and "Fogging-"—the Influence of Various Raw Materials and their Processing Methods,* M. Kaussen, pages 161–165 (translation) states that fogging results from all volatile substances in the interior equipment including from fabrics, plastics and leather. Analyses of fogging derived from leather show that a number of the chemicals used in conventional leather treatment operations contribute to fog such as for example, residual natural fats in wet blues; phenolic fungicides; dyestuffs; phthalates and mineral oil additives used as anti-dust agents; and solvents, emulgators (sic-emulsifiers) and plasticizers used in finishes. However, the most important of all the factors contributing to fogging due to leather has been found to be the fats, both natural fats and fatliquors, such as triglycerides and free fatty acids, which directly result from the fatliquoring leather treatment step. This publication stresses the importance of a degreasing step to reduce leather fogging and generally suggests that fatliquors used in car upholstery leather manufacture should, if possible, contain no solvents or preferably be substances which are not very volatile. The publication concludes, based on reflexion (sic-reflectance) fogging measurements, that fatliquors based on paraffin sulphonates, chloroparaffin sulphonates", wool fat sulphitates (sic-sulphites) and fish oil sulphitates"' (sic-sulphites) show good fogging results. *Fogging Characteristics of FatLiquors and CarSeat Leathers: Part 1: Preliminary Studies,* Samir Das Gupta (May 11, 1989), discusses the state of the art in leather fogging testing, particularly reflectance tests and gravimetric tests. In evaluating these tests a number of conventional fatliquors were used. Attempts at correlating the extent of volatiles in the fatliquor and the fogging results obtained were not successful. In some respects, the conclusions reached in this evaluation, particularly with respect to sulphonated fish oil and sulphonated chloroparaffins, were exactly the opposite of the Das Leder study reported above. One reason for this was reported to be due to significant differences between the reflectance fogging tests and gravimetric tests; the gravimetric test being considered a more rigorous test.

Some automakers have published their own fogging test procedures and have established their own fogging requirements. Some of these are reflectance tests, as for example Ford Motor Company, and some also incorporate gravimetric tests, such as Daimler-Benz.

It is an object of the present invention to provide a polymer for retanning and fatliquoring leather which provides the treated leather with both the requisite strength and temper characteristics typically associated with conventional fatliquors and significantly reducing fogging.

It is a further object of the present invention to provide a retanning fatliquoring polymer which meets gravimetric fogging requirements.

SUMMARY OF THE INVENTION

A method for treating leather with a low fogging retan fatliquor, substantially free from organic solvent, containing a dispersion of a selected amphiphilic copolymer formed from a predominant amount of at least one hydrophobic monomer and a minor amount of at least one copolymerizable hydrophilic monomer. The treatment method produces leather having desirable strength and softness qualities and particularly low fogging characteristics, the leather being particularly suitable for use in vehicle upholstery.

DETAILED DESCRIPTION OF THE INVENTION

This invention is directed to the use of dispersions of selected amphiphilic copolymers, substantially free from organic solvents, for treating leather during the conventional fatliquor step. The amphiphilic copolymers have been selected because of their ability to provide the leather with desirable strength and aesthetic softness characteristics while surprisingly reducing the fatliquored leather's fogging characteristics.

We have found that dispersions of these amphiphilic copolymers, preferably in the form of aqueous emulsions, are substantive, or in other words they remain in the treated leather, and provide exceptionally low fogging even under stringent conditions.

The selected amphiphilic copolymer must contain at least one hydrophobic and at least one hydrophilic group. The copolymer is formed from greater than 10 percent by weight to less than 50 percent by weight of at least one hydrophilic monomer and greater than 50 percent by weight to less than 90 weight percent of at least one hydrophobic comonomer. It is preferred if the copolymer is formed from greater than about 15 percent by weight to less than about 45 percent by weight of at least one hydrophilic monomer and greater than about 55 percent by weight to less than about 85 weight percent of at least one hydrophobic comonomer, and even more preferred if the copolymer is formed from greater than about 20 percent by weight to less than about 40 percent by weight of at least one hydrophilic monomer and greater than about 60 percent by weight to less than about 80 weight percent of at least one hydrophobic comonomer.

The selection of the relative amount of hydrophobic to hydrophilic monomers used for preparing the amphiphilic copolymers is the result of empirical testing of copolymers compared with controls, as will be demonstrated by the illustrative examples which follow this description.

The hydrophilic monomer used to prepare the amphiphilic copolymer is at least one monomer selected from water soluble ethylenically unsaturated, preferably monoethylenically unsaturated, acidic or basic monomers or mixtures thereof. Examples of suitable hydrophilic monomers include acrylic acid; methacrylic acid; itaconic acid; fumaric acid; maleic acid; and anhydrides of such acids; acid substituted (meth)acrylates, such as for example, phosphoethyl methacrylate and sulfoethyl methacrylate; acid substituted (meth)acrylamides such as, for example, 2-acrylamido-2-methylpropylsulfonic acid; and basic substituted (meth)acrylates and (meth)acrylamides, such as for example, amine substituted methacrylates including dimethylaminoethyl methacrylate, tertiarybutyl-aminoethylmethacrylate, and dimethylaminopropyl methacrylamide and the like. The preferred water soluble hydrophilic monomers used to prepare the amphiphilic copolymer are acrylic acid and methacrylic acid.

The selection of the nature and concentration of the hydrophilic monomer was made to impart the amphiphilic copolymer with the ability to be well dispersed in the continuous phase which is substantially free from organic solvents, such as for example in water, and for the amphiphilic copolymer to be prepared at high polymer solids at a handleable or shearable viscosity without adversely affecting the ability of the copolymer to penetrate the leather.

The hydrophobic comonomer used to prepare the amphiphilic copolymer is at least one monomer selected from alkyl (meth)acrylates; primary alkenes, and vinyl esters of alkyl carboxylic acids, and mixtures thereof. Suitable hydrophobic monomers include $C_4$ to $C_{12}$ alkyl acrylates; $C_4$ to $C_{12}$ alkyl methacrylates; $C_4$ to $C_{12}$ 1-alkenes, and vinyl esters of $C_4$ to $C_{12}$ alkyl carboxylic acids. The preferred hydrophobic monomers which have been found to provide the amphiphilic copolymer with the best performance characteristics are the $C_4$ to $C_{12}$ alkyl (meth) acrylates and mixtures thereof, most preferably 2-ethylhexylacrylate.

The use of the term "(meth)" followed by another term such as acrylate or acrylamide, as used throughout the disclosure, refers to both acrylates or acrylamides and methacrylates and methacrylamides, respectively.

Minor amounts of other ethylenically unsaturated copolymerizable monomers at concentrations equal to or less than 50 weight percent of the total hydrophobic comonomer concentration may be used in combination with a predominant amount (greater than about 50 weight percent) of at least one of the above types of hydrophobic comonomers. These additional hydrophobic comonomers have been found to be useful as diluents for the other hydrophobic comonomers without adversely affecting the fatliquor properties obtained upon treatment with the amphiphilic copolymer. Examples of such useful copolymerizable hydrophobic diluent comonomers include styrene, methylstyrenes, vinylacetate, (meth)acrylonitrile n-alkyl(meth)acrylamides and olefins.

The amphiphilic copolymer may be prepared by the polymerization of the hydrophilic and hydrophobic monomers by any conventional polymerization technique. We have found a preference for conducting the polymerization using standard emulsion polymerization procedures using a water soluble free radical initiator at a concentration of from about 0.1 weight percent to about 3 weight percent on total monomers. The polymerization is preferably conducted at a temperature of from about 40 degrees C. to about 100 degrees C., preferably from about 50 to 70 degrees C., using a chain transfer agent, such as for example a mercaptan, to control the molecular weight. The weight average molecular weight of the amphiphilic copolymer useful in the method of the invention can be as low as about 2500 to as high as about 100,000 weight average molecular weight, preferably less than about 50,000. The polymerization may be conducted by polymerizing all monomers together or by the gradual addition of monomers until polymerization is essentially complete. Residual unreacted monomers can be incorporated into the polymer by the addition of subsequent initiator by techniques well known in the art. The polymerization produces a concentration of amphiphilic polymer solids in a nonorganic solvent of from as low as about 20% solids to as high as about 60% solids. The amphiphilic copolymers exemplified in the illustrative examples presented hereinafter were made according the process described in example 1 by varying the selection and proportion of monomers and the relative amount of chain transfer agent to obtain different molecular weight polymers.

The treatment process of the invention involves subjecting leather to the selected amphiphilic copolymer dispersion. The amount of copolymer used to treat the leather is in the range of from about 1 to about 20 weight percent polymer solids on weight of leather, preferably in the range of from about 2 to about 15 weight percent and most preferably in the range of from about 3 to about 12 weight percent. We evaluated the amphiphilic copolymers by comparing the aesthetics, strength, flexibility and fogging characteristics of leathers treated with conventional fatliquors promoted as being "low fogging" fatliquors. The strength of the treated leather was measured by a technique called elongation at grain crack and elongation at ball burst. These techniques are commonly used in the art to evaluate the effectiveness of fatliquors to lubricate and strengthen the leather. The test is designed to reproduce the stretching of leather over a last during shoemaking, using an instrument called a Lastometer. A strip of treated leather is clamped in place and a probe then stretches the leather. The extension of the leather under the force of the probe is measured in millimeters at the point where the crack is first observed in the grain ("grain crack") and at the point where the leather tears ("ball burst"). The greater the extension at grain crack and ball burst, the greater the strength of the leather.

In addition to evaluating the improvement in strength achieved by the application of the selected amphiphilic copolymers, we also quantitatively evaluated the temper of the leather. Temper is a measure of the flexibility and elasticity of leather; the higher the temper, the better the leather's flexibility and elasticity. We measured the temper of treated leather samples using a Hunter-Spring compression tension tester modified according to Stubbings and E. Senfelder, JALCA, Vol. 58, No. 1, Jan, (1963), and established as a minimum criterion a temper value of about 150 mils.

In addition to evaluating the strength and temper of the treated leather, we qualitatively observed the aesthetic feel of the treated leather. This was done by assigning a rating to the treated leather samples, designating the leather as either being soft, firm or hard.

The fogging characteristics of the amphiphilic retan fatliquor copolymers were measured by a gravimetric test method. The test method used is an industry standard designated as DIN 75201 in which each piece of leather to be evaluated was dried using phosphorous pentoxide in a desiccator for 7 days. Each gravimetric measurement was run in duplicate. The values reported are the weights of measured (condensed) fog, the lower the value the better. Acceptable low fogging as determined by this gravimetric test is a value lower than 2 mg.

Preparation of Leathers

The evaluation of the selected amphiphilic retan fatliquors and certain conventional fatliquors designated as low fogging fatliquors were compared. The leathers prepared according to the following procedure (Control Procedure) were used to evaluate two conventional, commercial low fogging fatliquors: a sulfochlorinated oil, and a sulfonated fish oil. Procedure A was used to treat leathers with the selected amphiphilic copolymer retan fatliquors of the invention. Unless otherwise noted, all leathers were prepared 3 ounce (1.19 mm. thick) to 3.5 ounce (1.389 mm. thick) chrome tanned cowhides. The procedure is applicable, however, to other types of hides and skins such as mineral ( chrome, aluminum, zirconium, titanium, magnesium) tanned animal substrates such as pigskin, sheepskin, and the like. All weights are based on the weight of the blue stock (100% means a weight equal to the weight of the stock in the drum).

Control Procedure

1) The stock was given a thirty minute open-door water wash at 40 degrees C.

2) To this was added 100% float (float refers to water: 100% float means the addition of a weight of water equal to the stock weight) at 40 degrees C. and then 2% sodium acetate and 0.25% sodium bicarbonate was added. The mixture was then drummed (mixed) for 120 minutes.

3) The drum was then drained and the stock was given a 15 minute open door water wash at 50 degrees C.

4) To this was added 100% float at 46 to 54 degrees C.

5) A conventional retanning agent (6.0% Leukotan® 970 at 32% solids equal to 1.9% active Leukotan®) was diluted with an equal weight of water and added to the drum mixture through the gudgeon (drum opening). The mixture was then drummed for 30 minutes.

6) One percent formic acid (prediluted to a 10% solution) was then added and the stock was then drummed for 15 minutes.

7) The drum was drained. To the drum was then added 200% float at 50 degrees C. and then the sulfochlorinatd oil fatliquor (65% active) dispersed in 20% water at 50 degrees C. was added followed by drumming the mixture for 60 minutes.

8) 1.0% formic acid was then added to fix the fatliquor and the stock was then drummed for 15 minutes and then drained.

9) The stock was washed for 15 minutes with the door open at 35 degrees C.

10) The stock was then horsed (piled on a wooden horse) overnight.

11) The stock was then set out and hung to dry overnight and conditioned for 1–7 days in a constant temperature room at 72 degrees F., 60% relative humidity and then staked (mechanically softened).

Procedure A

1) The stock was given a thirty minute open-door water wash at 40 degrees C.

2) To this was added 100% float at 40 degrees C. and then 2% sodium acetate and 0.25% sodium bicarbonate was added. The mixture was then drummed (mixed) for 4 hours.

3) The drum was then drained and the stock was given a 15 minute open door water wash at 50 degrees C.

4) The amphiphilic copolymer was dispersed in 100% float with vigorous stirring and either sodium hydroxide (in case where the copolymer was formed from acidic hydrophilic comonomer) or formic acid (in case where the copolymer was formed from a basic hydrophilic monomer) was added in an amount sufficient to neutralize about 75% of the polymeric acid or base respectively. The amphiphilic copolymer so dispersed in 100% float was then added to the stock in the tanning drum and the mixture was drummed for 60 minutes at 50 degrees C. The amphiphilic copolymer was charged at 6 weight percent on stock weight unless otherwise indicated.

5) One percent formic acid (prediluted to a 10% solution) was then added when acidic hydrophilic comonomer was used or one percent sodium bicarbonate when a basic hydrophilic comonomer was used, and the stock was then drummed for 15 minutes at 50 degrees C. This step was repeated in order to adjustr the float pH to 4.0 or less.

6) The drum was drained and the stock was washed for 15 minutes with the door open at 35 degrees C.

7) The stock was then horsed (piled on a wooden home) overnight.

8) The stock was then set out and hung to dry overnight, and conditioned for 1-7 days in a constant temperature room at 72 degrees F., 60% relative humidity and then staked (mechanically softened).

The following examples are presented to illustrate the invention and the results obtained by the test procedures. The examples are illustrative only and are not intended, nor should they be construed, to limit the scope of the invention as modifications should be obvious to those of ordinary skill in the art.

EXAMPLE 1

Preparation of Amphiphilic Copolymers 70 weight percent 2-ethylhexyl acrylate/30 weight percent methacrylic acid.

The polymerization was conducted under nitrogen atmosphere in a one liter, four necked round bottom flask equipped with a Teflon® blade stirrer in the center neck, a thermometer and a reflux condenser. Into the flask was charged grams deionized water, 4 grams sodium lauryl sulfate, 1 drop of sulfuric acid and 0.3 grams of a 1 weight percent solution of ferrous sulfate, This mixture was then heated to 60 degrees Centigrade. The monomers (140 grams of 2-ethylhexyl acrylate and 60 grams of methacrylic acid) along with 10 grams of n-dodecane thiol chain transfer agent were emulsified with 95 grams of deionized water and 4 grams of sodium lauryl sulfate, and, simultaneously with the initiators, 0.6 grams ammonium persulfate diluted with 22 grams water and 0.6 grams sodium bisulfite diluted with 22 grams water, were fed to the reaction flask over a three hour period maintaining the temperature of the reaction mixture at 60 degrees C. At the end of the additions, any remaining monomer was converted to polymer by the shotwise addition of 0.1 gram additional redox and free radical initiators. The polymer emulsion was then cooled and the pH was adjusted by the addition of 20.4 grams of 13% aqueous solution of sodium hydroxide. The final product contained 37.8 percent solids by weight and has a pH of 5.5. The weight average molecular weight of the polymer, as measured by gel permeation chromatography using polyacrylic acid copolymer as the standard, was 8200 and the number average molecular weight was 6600.

EXAMPLE 2

Evaluation of Treated Leather

Leather samples treated with no fatliquoring agent (Bluestock), the amphiphilic copolymers of the invention and comparative, conventional low fogging fatliquors ("Comp.") were evaluated according to the Procedures described above. The results are shown in the following table (Table 1).

TABLE 1

| Fat Liquor Composition | Mol. WT | | EGC | EB | TEMPER | FOGGING[1] | |
|---|---|---|---|---|---|---|---|
| wt % | Mw | Mn | mm | mm | mils | Grav. mg. | Feel |
| Bluestock | — | — | 5.7 | 8.8 | 118 | 0.49, 0.35 | hard |
| 70 EHA/30 MAA | 22000 | 12000 | 8.3 | 12.3 | 159 | 0.68, 0.44 | firm |
| 70 EHA/30 MAA | 6200 | 4900 | 10.0 | 13.2 | 179 | 0.78, 0.57 | soft |
| (Comp.) sulfochlorinated oil | — | — | 8.8 | 12.2 | 194 | 1.17, 0.99 | soft |
| Bluestock | — | — | 6.2 | 9.7 | 123 | 0.59, 0.52 | hard |
| 85 EHA/15 MAA | 8000 | 6500 | 8.8 | 12.6 | 178 | 0.24, 0.48 | soft |
| 60 EHA/40 MAA | 8000 | 6500 | 9.2 | 12.9 | 185 | 0.57, 0.73 | firm |
| (Comp.) sulfochlorinated oil | — | — | 8.9 | 13.0 | 187 | 0.95, 0.95 | soft |
| Bluestock | — | — | 6.7 | 9.2 | 122 | 0.59, 0.62 | hard |
| 85 EA/15 MAA (Comp.) | 8000 | 6500 | 8.2 | 12.2 | 133 | 0.96, 0.96 | hard |
| 70 EHA/30 MAA | 8200 | 6600 | 8.2 | 12.0 | 155 | 0.40, 0.53 | firm |
| (Comp.) sulfochlorinated oil | — | — | 10.0 | 12.5 | 195 | 0.92, 0.84 | soft |
| Bluestock | — | — | 7.7 | 10.5 | 117 | — | hard |
| 70 LA/30 MAA | 12,600 | 2100 | 10.6 | 13.2 | 189 | 1.28, 1.51 | soft |
| 80 BA/20 AA | 10,600 | 5100 | 9.9 | 13.2 | 180 | 0.85, 0.80 | soft |
| (Comp.) sulfonated marine oil | — | — | 9.5 | 12.3 | 179 | 4.02, 3.52 | soft |
| Bluestock | — | — | 7.8 | 10.5 | 111 | — | hard |
| 80 EHA/20 MAA | 7300 | 4900 | 10.6 | 14.7 | 208 | 1.16, 1.30 | firm |
| 80 EHA/20 AA | 21300 | 5700 | 9.6 | 13.0 | 190 | 0.97, 1.09 | soft |
| (Comp.) sulfonated marine oil | — | — | 9.4 | 12.4 | 196 | 4.49, 4.16 | soft |
| Bluestock | — | — | 7.7 | 10.8 | 109 | — | hard |
| 70 LMA/30 MAA | 12100 | 2100 | 9.2 | 13.2 | 168 | 1.91, 1.64 | firm |
| 70 BA/30 MAA | 7600 | 5100 | 8.6 | 12.0 | 159 | 1.64, 1.59 | hard |

TABLE 1-continued

| Fat Liquor Composition | Mol. WT | | EGC | EB | TEMPER | FOGGING[1] | |
|---|---|---|---|---|---|---|---|
| wt % | Mw | Mn | mm | mm | mils | Grav. mg. | Feel |
| 70 CEMA/30 AA (Comp.) | — | — | 10.6 | 15.1 | 199 | 7.82, 7.44 | soft |

Notes:
[1]All gravimetric fogging tests (DIN 75201 as modified as described on page 11) were run in duplicate. The results of both tests are reported
2. The following abbreviations denote the monomers used to prepare synthetic fatliquor copolymers.
AA = Acrylic Acid
MAA = Methacrylic acid
LMA = Lauryl methacrylate
EA = Ethyl acrylate
EHA = Ethyl hexylacrylate
CEMA = cetyl-eicosyl methacrylate
BA = Buryl acrylate
LA = Lauryl acrylate

What is claimed is:

1. A method for imparting low fogging characteristics to leather which has been tanned and not previously subjected to a fatliquor comprising subjecting tanned leather to at least one weight percent copolymer solids, based on the weight of the leather of a dispersion of an amphiphilic copolymer, substantially free from organic solvent, formed from greater than 10 percent by weight to less than 50 percent by weight of at least one water-soluble ethylenically unsaturated acidic or basic hydrophilic comonomer selected from the group consisting of acrylic acid, methacrylic acid, itaconic add, fumaric acid, maleic acid, and anhydrides of such acids; acid substituted (meth)acrylates, acid substituted (meth)acrylamides and basic substituted (meth)acrylates and (meth)acrylamides and greater than 50 percent by weight to less than 90 weight percent of at least one hydrophobic comonomer selected from the group consisting of $C_4$ to $C_{12}$ alkyl acrylates, $C_4$ to $C_{12}$ alkyl methacrylates, $C_4$ to $C_{12}$ 1-alkenes, and vinyl esters of $C_4$ to $C_{12}$ alkyl carboxylic acids, where said amphiphilic copolymer has a weight average molecular weight of from about 2500 to about 100,000 and where the leather so treated has a gravimetric fogging value not more than 2 mg greater than the gravimetric fogging value of the leather after tanning but before any subsequent treatment.

2. The method of claim 1 wherein said copolymer is formed from greater than about 15 percent by weight to less than about 45 percent by weight of at least one hydrophilic monomer and greater than about 55 percent by weight to less than about 85 weight percent of at least one hydrophobic comonomer.

3. The method of claim 1 wherein said copolymer is formed from greater than about 20 percent by weight to less than about 40 percent by weight of at least one hydrophilic monomer and greater than about 60 percent by weight to less than about 80 weight percent of at least one hydrophobic comonomer.

4. The method of claim 1 where said amphiphilic copolymer is formed by aqueous emulsion polymerization, and where said amphiphilic copolymer is present as a dispersion in water.

5. The method of claim 1 wherein said amphiphilic copolymer has a weight average molecular weight of from about 2500 to about 50,000.

6. The method of claim 1 wherein said hydrophobic comonomer further comprises less than 50 weight percent of one or more hydrophobic comonomers selected from the group consisting of styrene, methylstyrenes, vinyl acetate, (meth)acrylonitrile and n-alkyl (meth)acrylamides olefins.

7. The method of claim 1 wherein said amphiphilic copolymer comprises from about 20 to about 60 weight percent of the weight of the solution or dispersion.

8. The method of claim 1 where said hydrophilic comonomer is acrylic acid and said hydrophobic comonomer is a $C_4$ to $C_{12}$ alkyl methacrylate.

9. The leather produced by the method of claim 1.

* * * * *